United States Patent [19]

Isono et al.

[11] Patent Number: 4,572,317

[45] Date of Patent: Feb. 25, 1986

[54] POSITION CONTROL SYSTEM FOR THE BODY OF A VEHICLE

[75] Inventors: Tokio Isono, Tokyo; Shoji Tachikawa, Saitama, both of Japan

[73] Assignee: Honda Giken Kogyo K.K., Tokyo, Japan

[21] Appl. No.: 546,483

[22] Filed: Oct. 28, 1983

[30] Foreign Application Priority Data

Nov. 1, 1982 [JP] Japan ............................... 57-192091

[51] Int. Cl.⁴ ........................................... B62K 25/10
[52] U.S. Cl. ................................... 180/227; 180/282; 280/285; 280/703
[58] Field of Search .................. 180/218, 227, 282; 280/284, 285, 690, 702, 703, 709, 710, 714, 276; 188/319

[56] References Cited

U.S. PATENT DOCUMENTS

| | | | |
|---|---|---|---|
| 2,289,907 | 7/1942 | Friedlander | 280/703 X |
| 2,950,785 | 8/1960 | Patriquin | 280/709 X |
| 4,036,335 | 7/1977 | Thompson et al. | 188/319 |
| 4,159,105 | 6/1979 | Vander Laan et al. | 180/227 X |
| 4,159,756 | 7/1979 | Murakami et al. | 188/319 |
| 4,437,678 | 3/1984 | Schultz | 280/276 |
| 4,441,590 | 4/1984 | Giorgetti | 180/227 X |

FOREIGN PATENT DOCUMENTS

| | | | |
|---|---|---|---|
| 2505267 | 11/1982 | France | 280/703 |
| 1207706 | 10/1970 | United Kingdom | 188/319 |

*Primary Examiner*—Joseph F. Peters, Jr.
*Assistant Examiner*—Charles R. Watts
*Attorney, Agent, or Firm*—Arthur L. Lessler

[57] ABSTRACT

In a position control system for the body of a vehicle having a buffer supportingly connected between the vehicle body and the rear wheel(s), a deceleration sensor senses decelerating conditions of the vehicle and generates an output signal indicative of a sensed decelerating condition of the vehicle, and a damping force adjuster is responsive to the above output signal for adjusting the damping force produced by the buffer during expansion stroke of its damper so as to retard a motion of the rear wheel(s) in a direction away from the vehicle body.

9 Claims, 19 Drawing Figures

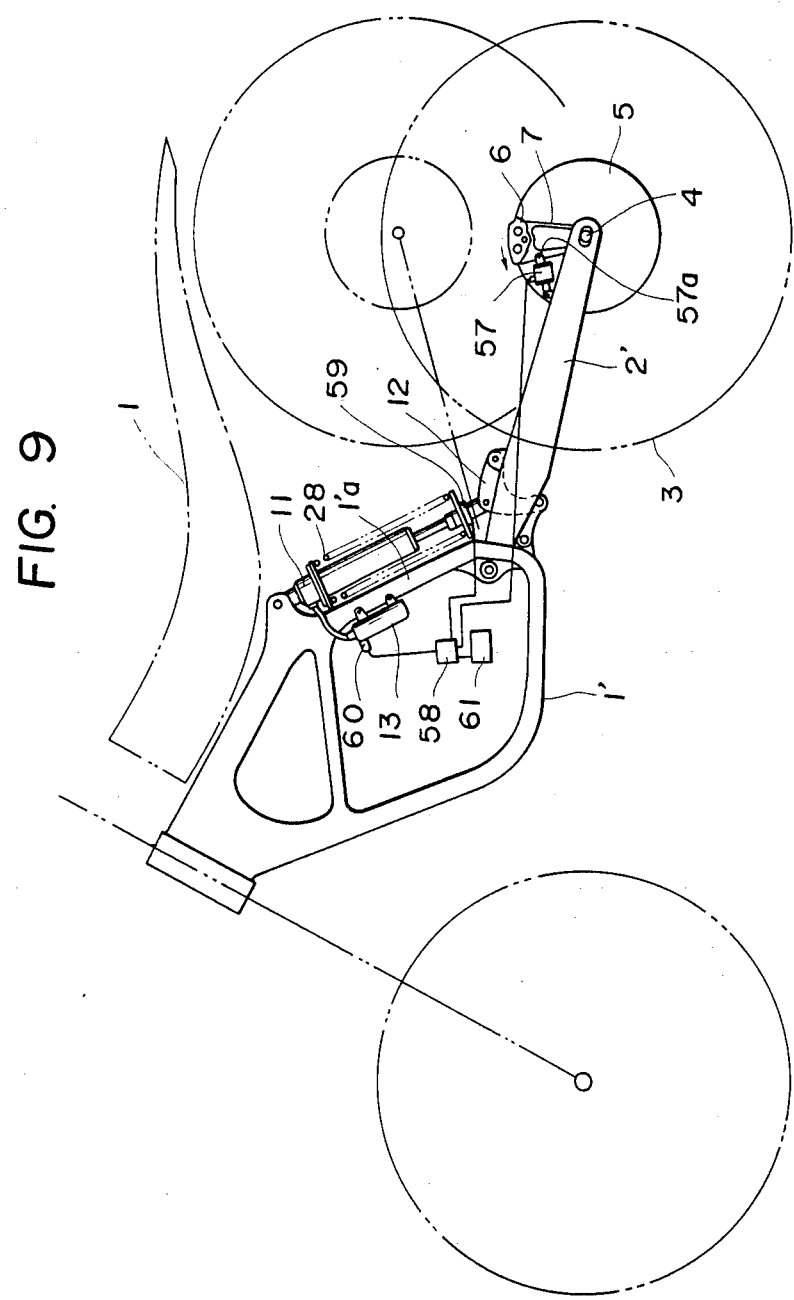

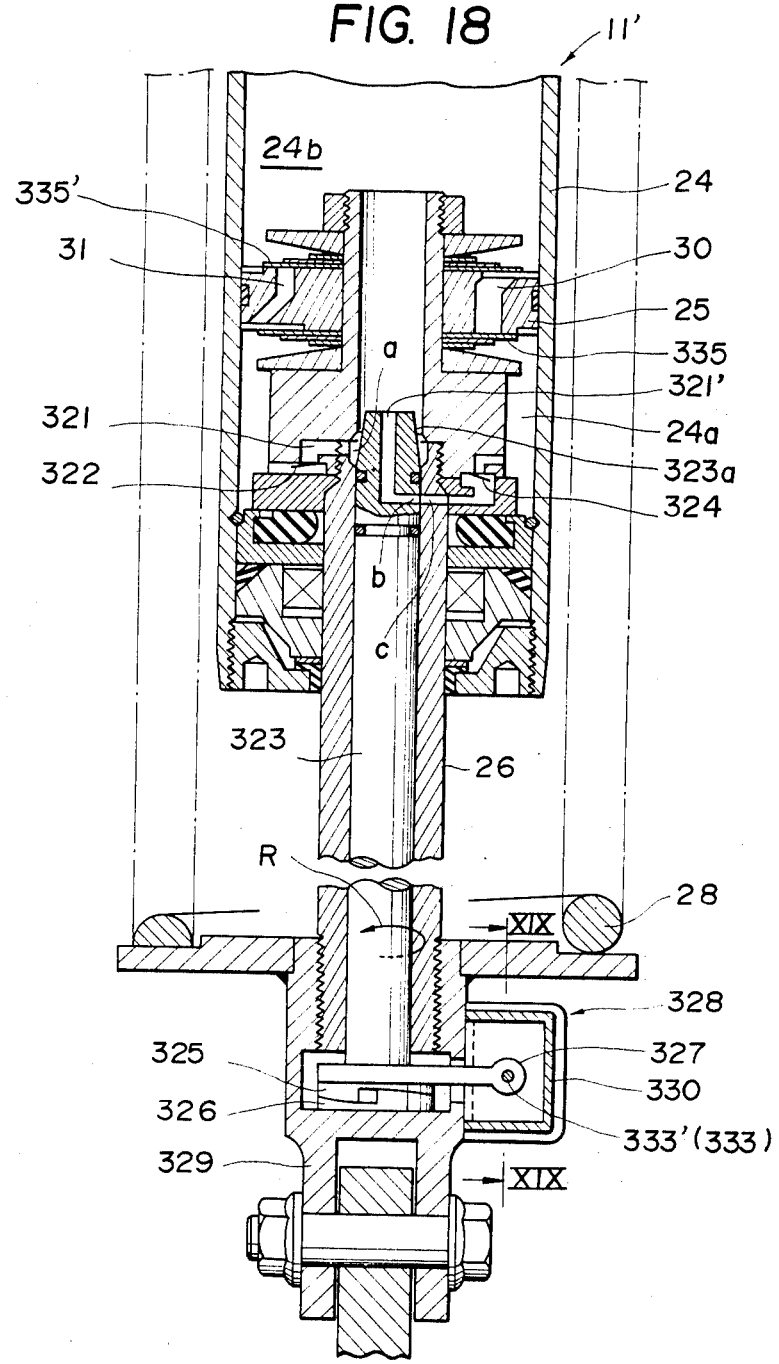

POSITION CONTROL SYSTEM FOR THE BODY OF A VEHICLE

BACKGROUND OF THE INVENTION

This invention relates to a position control system for controlling the position of the body of a vehicle, and more particularly to a position control system of this kind which is adapted to prevent a sudden change in the position of the body of a vehicle and an excessively reduced share of loads on the rear wheel(s) at deceleration of the vehicle.

Lately, it has been desirable for suspension systems for vehicles, for instance motorcycles, to impart soft riding comfort to the rider(s) and impart excellent running performance to the vehicle. To meet such requirements, some suspension systems have employed buffers with cushion springs having high flexibility. On the other hand, recent improvements in the tires and the brake system have imparted a greatly enhanced braking force to a vehicle. However, due to the combined effect of the high flexibility of the cushion springs and the greatly improved braking force, the body of a vehicle is prone to abrupt change in position upon braking.

More specifically, when a vehicle such as a motorcycle is braked, the front wheel suspension is contracted and at the same time the rear wheel suspension is elongated so that the vehicle body leans forward, resulting in a reduced share of loads on the rear wheel. To prevent such forward leaning of a motorcycle for instance, that is, contraction of the front wheel suspension at braking of the motorcycle, a variety of anti-nose dive devices have conventionally been employed. These anti-nosedrive devices are adapted to increase the damping force of the front wheel suspension on the contracting stroke at braking to prevent forward leaning of the motorcycle body. Therefore, these anti-nose-drive devices are merely capable of preventing contraction of the front wheel suspension but they are unable to fully prevent sudden lifting of a rear portion of the motorcycle body due to full elongation of the rear wheel suspension, and are also unable to prevent a sudden reduction in the share of loads on the rear wheel at braking of the motorcycle.

SUMMARY OF THE INVENTION

It is the object of the invention to provide a position control system for the body of a vehicle, which is capable of increasing the damping force of a buffer on the rear wheel side when its damper is on the expansion stroke at deceleration of the vehicle, e.g. at braking of same, thereby preventing a sudden change in the position of the vehicle body as well as a reduction in the share of loads of the rear wheel(s).

According to the invention, there is provided a vehicle body position control system for use in a vehicle including a body, at least one rear wheel, and a buffer having an elastic support elastically supporting said rear wheel on said vehicle body and a damper for generating a damping force for damping elastic vibrations of said elastic support. The vehicle body position control system comprises: a deceleration sensor for sensing decelerating conditions of the vehicle and generating an output signal indicative of a sensed decelerating condition of the vehicle; and a damping force adjuster responsive to the output signal for adjusting the damping force of the damper of the above buffer. The damping force adjuster is adapted to adjust the damping force so as to retard a motion of the rear wheel of the vehicle in a direction away from the vehicle body at a larger rate when the output signal is generated than when the output signal is not generated.

The above and other objects, features and advantages of the invention will be more apparent from the ensuing detailed description taken in conjunction with the accompanying drawings.

BRIEF DESCRIPTION OF THE DRAWINGS

FIG. 9 is a schematic side view of a motorcycle equipped with a position control system according to a fifth embodiment of the invention;

FIG. 18 is a fragmentary sectional view illustrating the damper in FIG. 17; and

DETAILED DESCRIPTION

The invention will now be described in detail with reference to the drawings illustrating several embodiments thereof.

Figure 1:
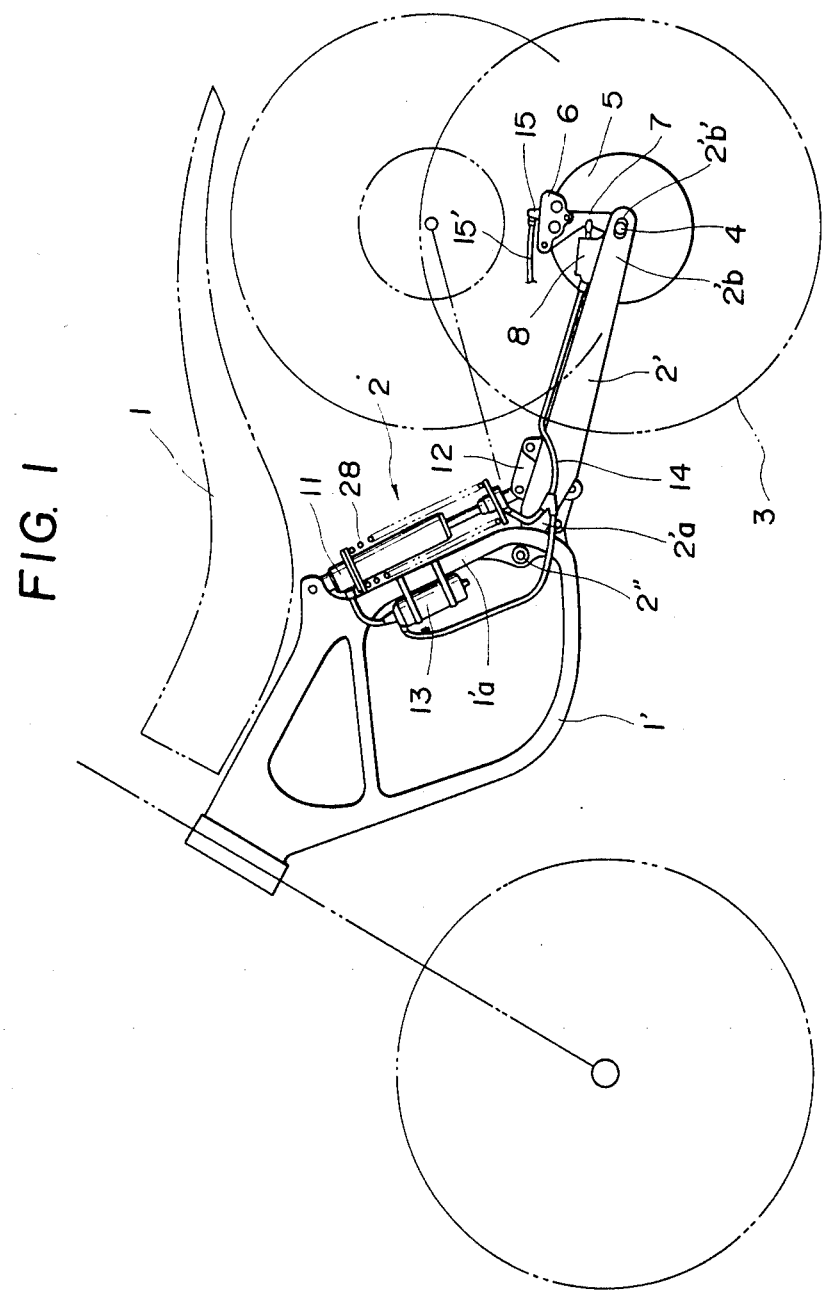
FIG. 1 is a schematic side view of a motorcycle equipped with a position control system according to a first embodiment of the invention.
Figure 2:
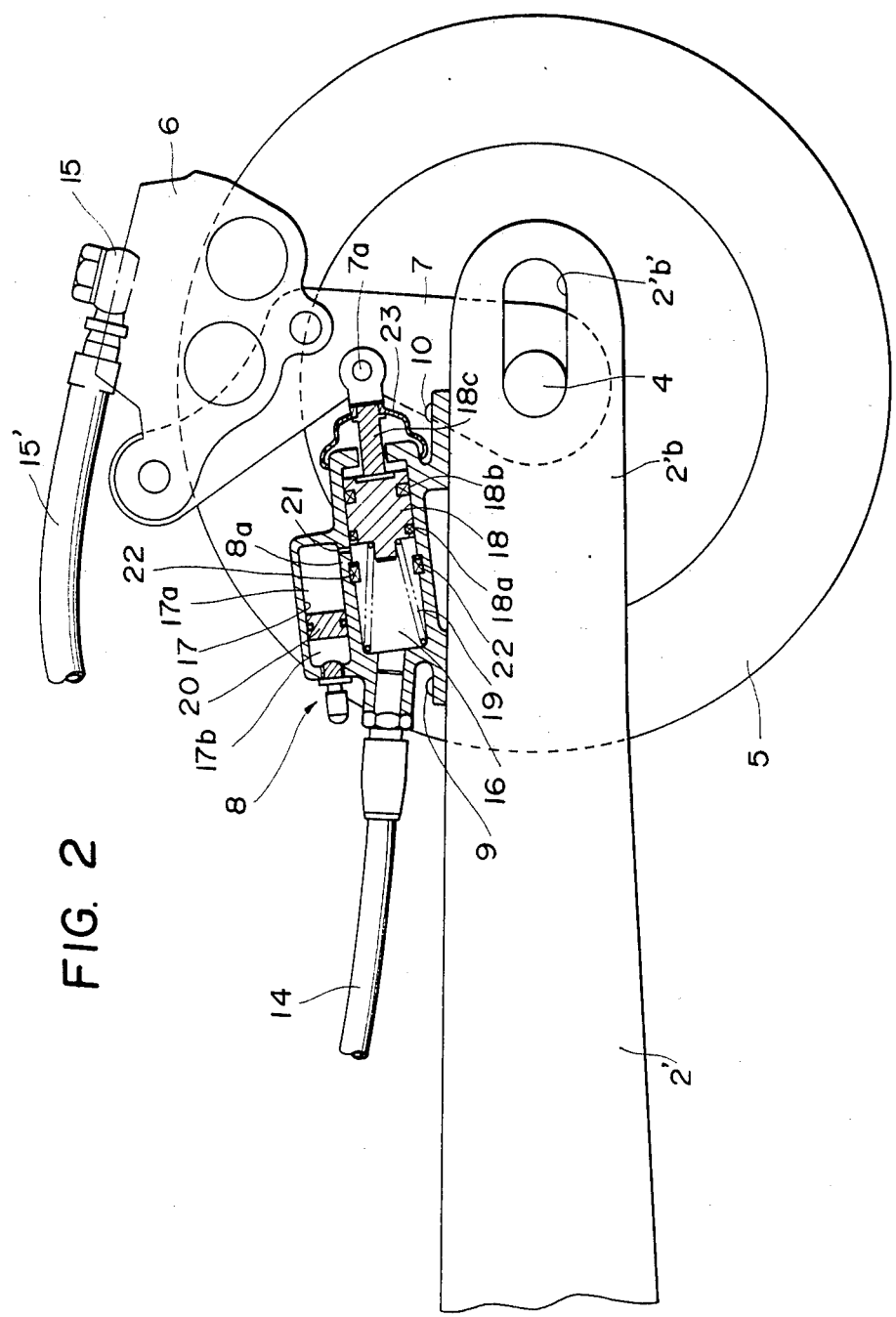
FIG. 2 is a fragmentary sectional view, partly in section, illustrating the braking system and the braking sensor in FIG. 1.
Figure 3:
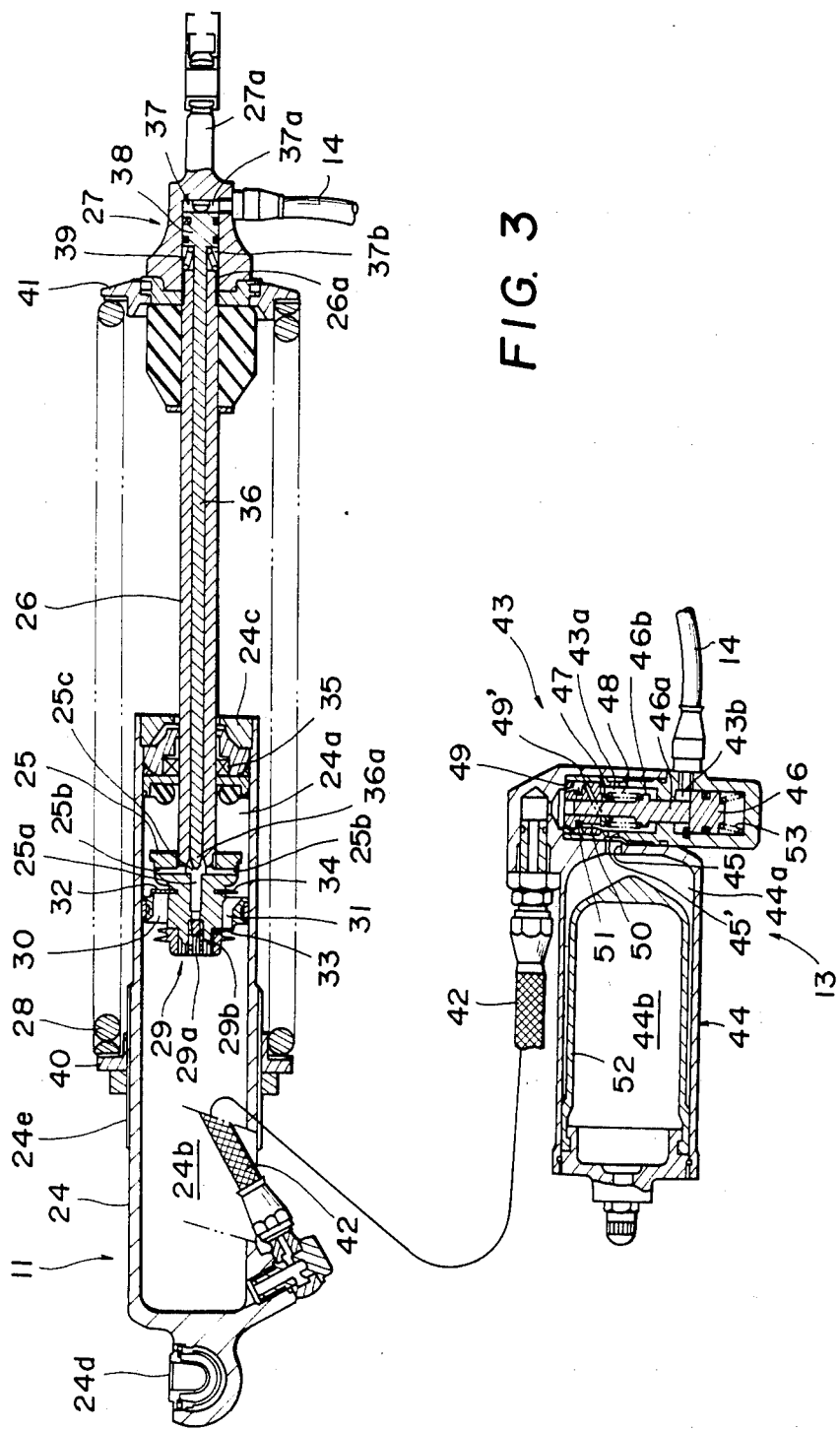
FIG. 3 is a sectional view illustrating the interior constructions of the rear damper and the sub tank in FIG. 1.

Referring first to FIGS. 1 through 3, there is illustrated a position control system for vehicles according to a first embodiment of the invention, which is installed on a motorcycle. In FIG. 1, the motorcycle comprises a body 1 and a rear wheel suspension 2 mounted on a rear portion of a frame body 1' forming part of the body 1. The rear wheel suspension 2 comprises a rear fork 2', a rear damper 11 mounted between the rear fork 2' and a center pillar 1'a of the frame body 1' by means of a link 12, and a cushion spring 28 formed by a coil spring fitted around the damper 11. The rear fork 2' has a front end 2'a pivotally coupled to a fulcrum shaft 2" fixed to a lower portion of the center pillar 1'a, and a rear end 2'b formed with an elongate through hole 2'b' through which supportedly extends a rear axle 4 which in turn supports a rear wheel 3.

The braking mechanism of the motorcycle includes a rear brake disk 5 rotatable about and in unison with the rear wheel 3, and a caliper 6. The caliper 6 is mounted on a caliper bracket 7 rotatably supported on the rear axle 4, and connected by a joint 15 to an oil pipe 15' leading to a rear master cylinder, not shown, which is actuatable by means of a brake pedal, not shown, so that the caliper 6 is supplied with pressurized oil from the rear master cylinder when the brake pedal is stepped on, to thereby impart a frictional braking force to the rear brake disk 5.

A braking sensor 8 is secured by bolts 9 and 10 to a rear end portion of the rear fork 2' to sense braking torque generated at braking of the rear brake disk 5, as best shown in FIG. 2. The braking sensor 8 is connected to the rear damper 11 as well as to a sub tank 13 connected thereto by means of a common oil pipe 14. As shown in FIG. 2, the braking sensor 8 includes a cylinder chamber 16 and a reservoir chamber 17. A piston 18 is slidably received within the cylinder chamber 16 and sealed in a liquidtight manner by means of oil seals 18a and 18b fitted thereon. One end of the piston 18 is formed integrally with a piston rod 18c connected to a fulcrum shaft 7a rotatably extending through the caliper bracket 7 to support same at its central portion. A return spring 19 is mounted tautly within the cylinder chamber 16 at the other end of the piston 18 and urges the piston 18 against the caliper bracket 7. The cylinder chamber 16 is communicated with the interiors of the rear damper 11 and the sub tank 13 by means of the oil pipe 14. A free piston 20 is slidably received in a liquidtight manner within the reservoir chamber 17 and separates the same chamber into an oil chamber 17a and a gas chamber 17b. The oil chamber 17a communicates with the cylinder chamber 16 through a through hole 21 formed through a partition wall 8a separating the both chambers from each other. On the other hand, the gas chamber 17b is filled with a compressed gas, for instance nitrogen gas, which urgingly biases the free piston 20 toward the oil chamber 17a to thereby pressurize the oil within the same chamber. Thermal expansion and contraction of the oil filled within the cylinder chamber 16 and the oil chamber 17a with changes in the temperature of the oil are allowed by corresponding movement of the free piston 20 within the reservoir chamber 17. The free piston 20 also serves to prevent air from being mixed into the oil. When the caliper bracket 7 is rotated about the rear axle 4 by braking torque produced at braking, and the piston 18 is correspondingly moved leftward as viewed in FIG. 2 to increase the oil pressure within the cylinder chamber 16. To prevent this oil pressure from increasing beyond a predetermined value, an annular stopper 22 is provided on the inner surface of the cylinder chamber 16 in a manner projected into the same chamber to determine the maximum stroke of the piston 18. In FIG. 2, reference numeral 23 designates a dust boot for protecting the braking sensor 8 from dust, etc.

FIG. 3 illustrates details of the rear damper 11 and the sub tank 13. The rear damper 11 is comprised of a cylinder 24, a piston 25, a piston rod 26, and a piston rod end member 27 forming part of a damping force adjuster.

The cylinder 24 has a hollow cylindrical shape, within which is slidably received the piston 25 which separates the interior of the same cylinder into a first cylinder chamber 24a and a second cylinder chamber 24b.

The piston 25 carries the piston rod 26 threadedly fitted in one end of the former. The piston 25 is formed therein with an axial oil passage 25a extending along its axis, and a radial oil passage 25b intersecting with the passage 25a. Arranged in the axial oil passage 25a at a side remote from the piston rod 26 is a check valve 29 which has a valve body 29a and a coil spring 29b urgingly biasing the valve body 29a in a position closing the axial oil passage 25a. Further, the piston 25 is formed therein with two axial through holes 30 and 31 located at its peripheral portion for communicating the opposite cylinder chambers 24a, 24b with each other. A reed valve 32 is mounted at an end of the through hole 30 opening in the first cylinder chamber 24a (on the side of the piston rod 26), which valve is adapted to be opened by oil pressure flowing in the through hole 30 as the piston 25 is moved leftward as viewed in FIG. 3, and to be closed as the piston 25 is moved rightward. The through hole 31 has a slightly smaller diameter than the through hole 30, and a reed valve 33 is mounted at an end of the through hole 31 opening in the second cylinder chamber 24b and is adapted to be closed by oil pressure flowing in the same hole 31 as the piston 25 is moved leftward and opened as the piston is moved rightward. A radial baffle sheet 34 is planted in the piston 25 in the vicinity of the end of the through hole 31 remote from the reed valve 33, to impart flow resistance to the oil flowing through the hole 31 from the first cylinder chamber 24a to the second cylinder chamber 24b as the piston 25 is moved rightward.

The piston rod 26 slidably extends through an end member 24c closingly fitted on an end of the cylinder 24, and kept in a liquidtight manner by an oil seal 35 fitted thereon. The piston rod 26 has a screw-threaded end portion 26a remote from the piston 25, on which the aforementioned piston rod end member 27 is rigidly threadedly fitted. The piston rod 26 is formed by a hollow pipe, and has its hollow interior slidably penetrated by a rod 36 which has a tip 36a on the side of the piston 25 projected into the intersecting portion 25c of the oil passages 25a, 25b so as to throttle the area of communication therebetween, to thereby vary the effective cross-sectional area of the intersecting portion 25c.

The piston rod end member 27 is formed therein with a cylinder chamber 37 within which is slidably received a piston 38 integral with the rod 36 and separating the cylinder chamber 37 into an oil chamber 37a and a spring chamber 37b. Disposed tautly within the spring chamber 37b on the side of the rod 36 is a return spring 39 which urges the piston 38 in a direction away from the piston 25. The opposite oil chamber 37a communicates with the cylinder chamber 16 of the braking sensor 8 by means of the aforementioned oil pipe 14. Therefore, as the oil pressure within the cylinder chamber 16 increases, the pressurized oil is introduced into the oil chamber 37a through the oil pipe 14 to cause leftward displacement of the piston 38 as viewed in FIG. 3, and accordingly the tip 36a of the rod 36 integral with the piston 38 advances more deeply into the intersecting portion 25c of the oil passages 25a, 25b within the piston 25 to thereby reduce the effective cross-sectional area of same.

An annular flange 40 is threadedly fitted on a screw-threaded outer peripheral wall portion 24e of the cylinder 24 in a manner adjustable in axial position on the cylinder 24. A coil spring 28 is bridged tautly between the annular flange 40 and another annular flange 41 fitted on the piston rod end member 27.

In mounting the rear damper 11 constructed as above onto the motorcycle body 1, one end of the rear damper 11 on the side of the cylinder 24 is supportedly coupled by a pin to an upper portion of the frame body 1' at a coupling 24d provided on the same end, and the other end of the rear damper 11 is supportedly coupled by a pin to the link 12 on the rear fork 2' at another coupling 27a provided on the same end of the rear damper on the side of the piston rod end member 27, in a manner shown in FIG. 1.

The sub tank 13 is comprised of a pressure adjusting block 43 as a damping force adjuster and a sub tank block 44, and is connected to the cylinder chamber 24b by way of an oil pipe 42. The pressure adjusting block 43 has a spring chamber 43a and an oil chamber 43b, the former communicating with the second cylinder chamber 24b of the cylinder 24 by way of the oil pipe 42 and also with the interior of the sub tank block 44 through two aligned through holes 45 and 45', and the latter communicating with the cylinder chamber 16 of the braking sensor 8 by way of the oil pipe 14. Slidably disposed within the oil chamber 43b is a piston 46 which has an integral piston rod 46a disposed within the spring chamber 43a and slidably inserted into an annular member 49 mounted within the same chamber. A slide valve 47 is slidably fitted on the piston rod 46a, and the annular member 49 is formed therein with an oblique communication passage 49' communicating at one end with the interior of the oil pipe 42 and terminating at the other end in an end face of the same member facing the slide valve 47. A coil spring 48 is interposed tautly between the slide valve 47 and an intermediate annular flange 46b formed integrally on the piston rod 46a. Thus, the slide valve 47 is biased by the urging force of the spring 48 to close the corresponding open end of the communication passage 49'. When the oil pressure within the cylinder chamber 24b of the cylinder 24 increases above the sum of the urging force of the spring 48 and the oil pressure within the sub tank 13, the communication passage 49' is opened so that the oil flows from the cylinder 24 into the sub tank 13. On the other hand, the annular member 49 is further formed therein with an axial communication passage 50 communicating the interior of the oil pipe 42 with the spring chamber 43a, with a reed valve 51 arranged thereacross. When the oil pressure within the cylinder 24 is higher than that within the sub tank 13, the reed valve 51 closes the communication passage 50, whereas when the former is lower than the latter, the reed valve 51 opens the passage 50 to allow oil to flow from the sub tank 13 into the cylinder 24.

The sub tank block 44 accommodates a flexible bladder 52 separating the interior of the same block into an oil chamber 44a and a gas chamber 44b, the former communicating with the spring chamber 43a of the pressure adjusting block 43 through the aforementioned through holes 45, 45', and the latter being filled with a compressed gas, for instance nitrogen gas.

With the above arrangement, during running of the motorcycle, shocks or vibrations being transmitted to the motorcycle body 1 from the rear wheel 3 rolling on the road surface are attenuated by the spring 28, and at the same time elastic vibrations of the spring 28 are damped by the damping action of the rear damper 11, thus ensuring comfortable driving.

More specifically, when the rear wheel 3 receives a shock from the road surface, the spring 18 is compressed and at the same time the rear damper 11 is contracted with its piston 25 moving leftward as viewed in FIG. 3. Accordingly, part of the oil within the second cylinder chamber 24b of the cylinder 24 is forced to flow through the through hole 30 of the piston 25 into the first cylinder chamber 24a. Then, when the spring 28 expands, accompanied by corresponding expansion of the damper 11 with the piston 25 moving rightward, part of the oil within the first cylinder chamber 24a is forced to flow into the second cylinder chamber 24b through the other through hole 31 of the piston 25. At the same time, another part of the oil within the first cylinder chamber 24a is forced to flow into the oil passages 25b, 25a to urgingly open the check valve 29 and then flows into the second cylinder chamber 24b through the opened valve 29, while simultaneously reducing the vibrations of the spring 28 due to flow resistance acting upon the oil flowing in the hole 31, and the oil passages 25b, 25a. As the internal volume of the cylinder 24 varies in response to the telescopic motion of the rear damper 11, that is, the movement of the piston rod 26 relative to the cylinder 24, part of the oil within the cylinder 24 moves between the cylinder 24 and the sub tank 13 via the oil pipe 42 and the communication passage 49' or 50.

Figure 4:
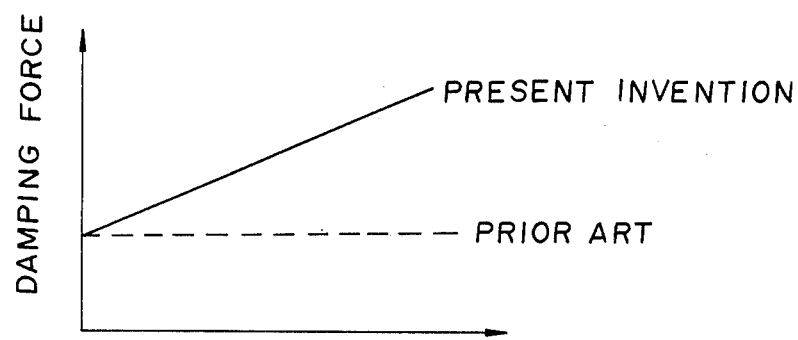
FIG. 4 is a graph showing the relationships between the damping force and the braking force according to a conventional rear damper and according to the rear damper in FIG. 1 of the present invention.

In braking the motorcycle by stepping on the brake pedal, pressurized oil is supplied from the rear master cylinder to the caliper 6 in FIG. 1 through the oil pipe 15' and the oil pipe joint 15 to apply a frictional braking force to the brake disk 5. Then, the caliper bracket 7 is rotated about the rear axle 4 in the counterclockwise direction in FIG. 1, which in turn causes leftward movement of the piston 18 of the braking sensor 8 as viewed in FIG. 2 so that the through hole 21 is closed by the piston 18 to increase the oil pressure within the cylinder chamber 16. This increased oil pressure is supplied through the oil pipe 14 into the cylinder chamber 37a of the piston rod end member 27 where it acts upon the piston 38. The piston 38 is urged by the increased oil pressure to move leftward as viewed in FIG. 3 so that the tip 36a of the rod 36 within the piston rod 26 advances into the intersecting portion 25c between the oil passages 25a, 25b to reduce the effective cross-sectional area of same. On this occasion, if a force acts upon the rear damper 11 so as to expand same, that is, a force acts upon the rear fork 2' so as to rotate same about the fulcrum shaft 2" in the clockwise direction as viewed in FIG. 1, the flow resistance remains the same as when no braking force is applied to the motorcycle, which acts upon the oil flowing from the first cylinder chamber 24a of the cylinder 24 into the second cylinder chamber 24b through the through hole 31 of the piston 25, but the flow resistance or damping force gradually increases which acts upon the oil flowing from the first cylinder chamber 24a into the second cylinder chamber 24b through the oil passages 25b, 25a and the check valve 29. This increased flow resistance acts upon the piston 25 so as to counteract its rightward movement. Therefore, when the motorcycle is in a braking condition, the expanding motion of the rear damper 11, i.e. the lifting motion of the rear wheel 3 away from the motorcycle body 1 is retarded at a larger rate than when no braking force is applied to the motorcycle, thereby preventing sudden expansion of the rear damper 11 and accordingly sudden forward leaning of the motorcycle body due to forward shifting of the center of gravity of the same body upon braking. While the damping force of the rear damper 11 is thus increased only during expansion of the damper, a shock given by the road surface and acting upon the rear damper 11 to contract same can be absorbed by the cushion spring 28 at a normal rate. By virtue of the arrangement that oil pressure having a magnitude corresponding to the braking force is produced in the cylinder chamber 16 of the braking sensor 8, and the tip 36a of the rod 36 moves in response to this oil pressure to advance into the intersecting portion 25c of the oil passages 25a, 25b to reduce the effective cross-sectional area of same, the damping force of the rear damper 11 can be controlled to a value proportional to the braking force applied to the motorcycle. To be specific, while the damping force of a conventional rear damper assumes a nearly constant value during expansion stroke of the damper irrespective of the braking force as indicated by the broken line in FIG. 4, the damping force of the rear damper 11 according to the present embodiment of the invention assumes a value gradually increasing with an increase in the braking force during expansion stroke of the rear damper as indicated by the solid line in FIG. 4.

Figure 5:
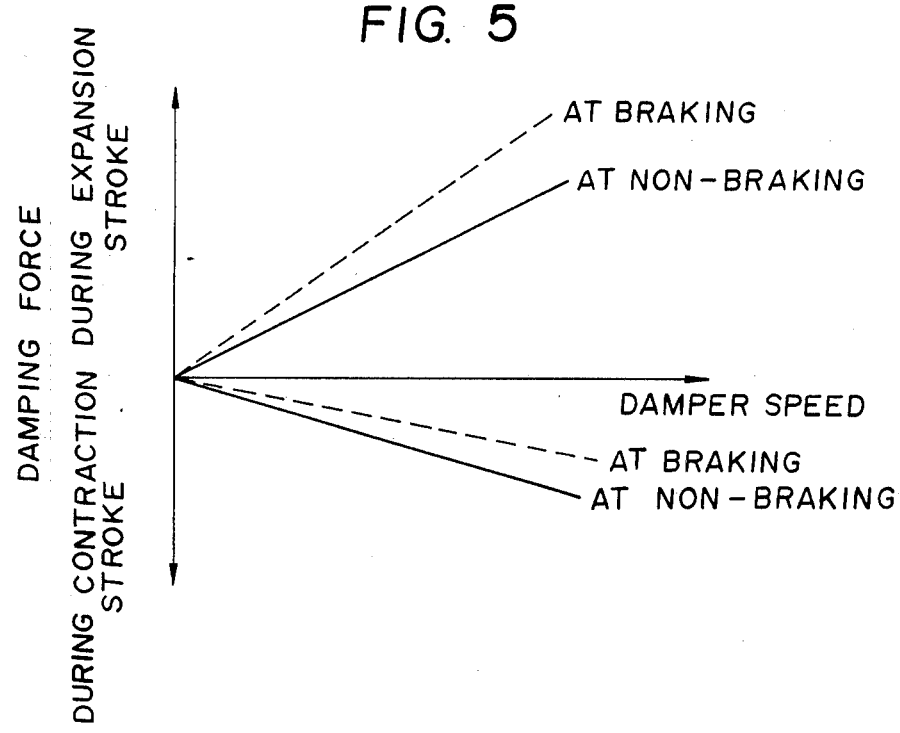
FIG. 5 is a graph showing the relationship between the damping force and the damper speed, achieved by the rear damper in FIG. 1.

Further, due to the communication through the oil pipe 14 between the cylinder chamber 16 of the braking sensor 8 and the chamber 43b of the pressure adjusting block 43, the piston 46 of the pressure adjusting block 43 is moved downward as viewed in FIG. 3 against the force of the return spring 53 when pressurized oil is supplied into the oil chamber 43b from the cylinder chamber 16. Consequently, the gap between the annular flange 46b of the piston rod 46a and the slide valve 47 is increased so that the spring 48 interposed between them is expanded to have its setting load reduced. Thus, when the motorcycle is braked, even if the oil pressure within the second cylinder chamber 24b of the cylinder 24 is lower than the valve opening pressure of the slide valve 47, the slide valve 47 can be easily opened by a smaller oil pressure within the cylinder chamber 24b so that the oil flowing from the cylinder 24 to the sub tank 13 through the communication passage 49' undergoes substantially reduced flow resistance, thereby reducing the damping force of the rear damper 11 during contraction stroke at braking of the motorcycle. As a result of this reduced damping force, a shock given by the road surface can be absorbed by the cushion spring 28 at a high rate. FIG. 5 shows the above explained damping characteristic of the rear damper 11 which is represented as a function of the contracting and expanding speeds of the damper 11, wherein the broken lines and the solid lines represent such damping characteristics at braking and at non-braking, respectively.

Since at braking the damping force of the rear damper 11 during expansion stroke thereof is set at a value higher than that at non-braking, but the damping force during contraction stroke thereof is reduced, sudden jumping of a rear portion of the vehicle body can be prevented at braking, and the vehicle can smoothly run on a road with roughness. Although in the present embodiment, the rear damper 11 has its damping force controlled both during contraction stroke and during expansion stroke, the damping force may be controlled only during contraction stroke of the rear damper or during expansion stroke of same, with excellents results.

Several other embodiments of the position control system for vehicle bodies according to the invention will now be explained. In the respective figures illustrating these embodiments, component elements corresponding, respectively, to those of the above explained first embodiment are designated by identical reference numerals, and detailed description of the constructions, arrangements and operations of such corresponding elements are omitted.

Figure 6:
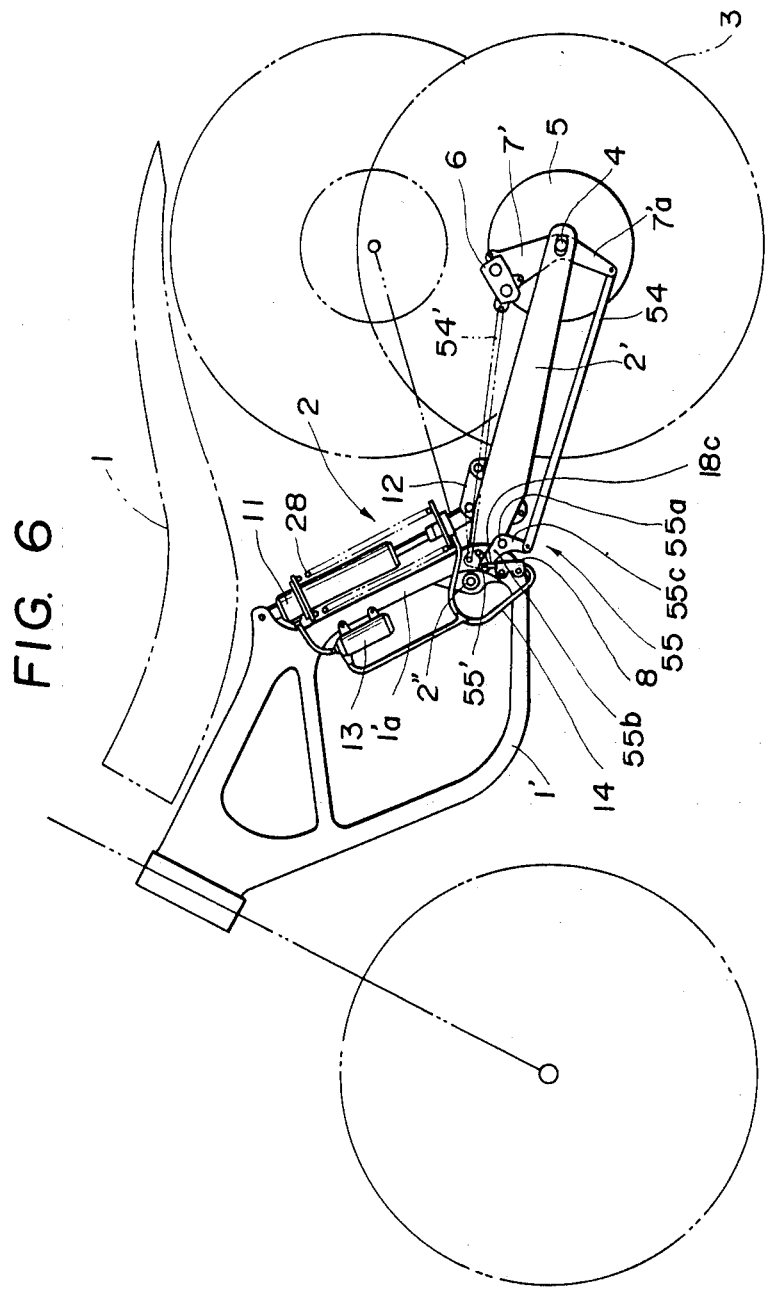
FIG. 6 is a schematic side view of a motorcycle equipped with a position control system according to a second embodiment of the invention.

FIG. 6 shows a second embodiment of the invention which has a substantially identical arrangement with that of the first embodiment but is distinguished from the latter in that the braking sensor 8 is arranged on the frame body 1' in place of the rear fork 2'. The braking sensor 8 may have a substantially identical construction as that of the first embodiment and is secured on a lower part of the center pillar 1'a of the frame body 1'. A link 55 is pivotably coupled at its intermediate portion 55a to the frame body 1'. The piston rod 18c of the braking sensor 8 is coupled to a driven portion 55b of the link 55 which has a driving portion 55c coupled to an extension 7'a of the caliper bracket 7'. With this arrangement, as the caliper bracket 7' rotates about the rear axle 4 at braking, the piston rod 18c of the braking sensor 8 is correspondingly displaced to produce an output oil pressure for controlling the damping force of the damper 11. According to the above arrangement of the present embodiment, braking torque is borne by the frame body 1', thereby enhancing the structural durability. As shown by the chain lines in FIG. 6, a torque rod 54' may alternatively be pivotably coupled at one end to the caliper 6 and at the other end to a link 55' to which the braking sensor 8 is coupled.

Figure 7:
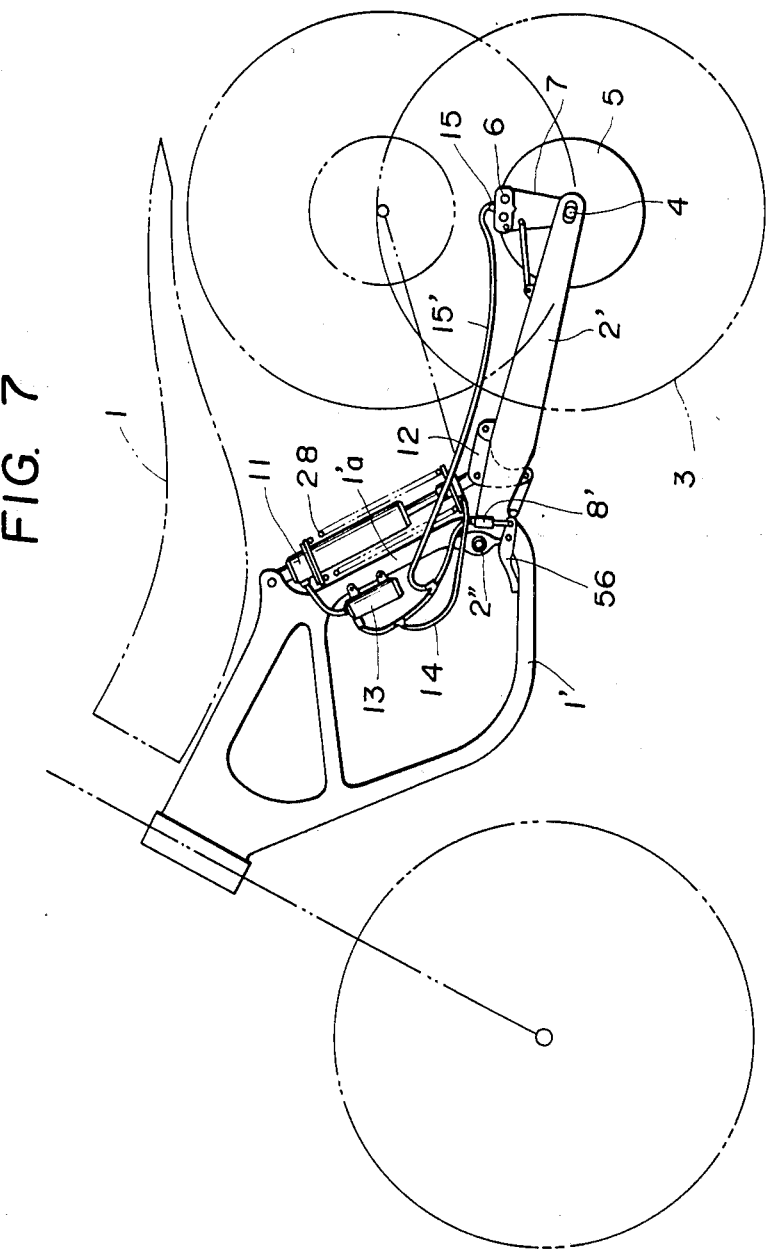
FIG. 7 is a schematic side view of a motorcycle equipped with a position control system according to a third embodiment of the invention.

FIG. 7 shows a third embodiment of the invention which is distinguished from the first embodiment substantially solely in that the braking sensor is formed by the rear brake system of a motorcycle. To be specific, a rear master cylinder 8 operatively connected to a brake pedal 56 is arranged such that it is operable upon stepping-on of the brake pedal 56 to supply pressurized oil to the caliper 6 for driving same on one hand, and also supply pressurized oil to the rear damper 11 and the sub tank 13 on the other hand for controlling the damping force of the rear damper 11, thus serving as a braking sensor.

Figure 8:
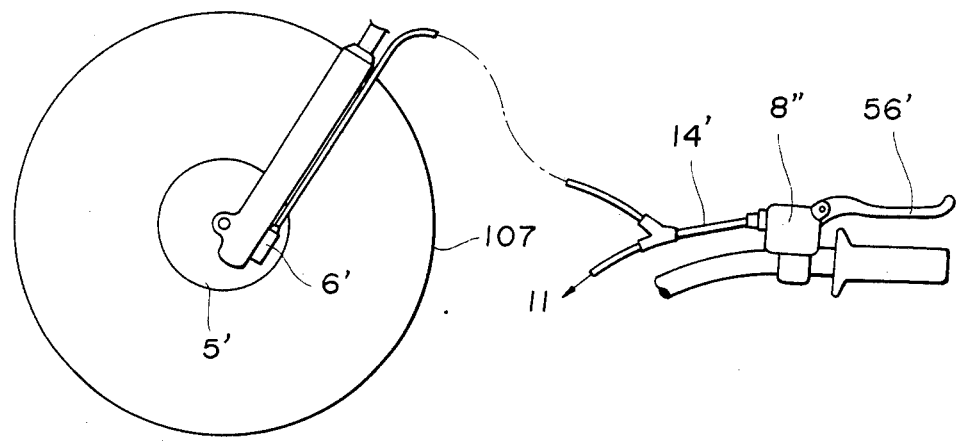
FIG. 8 is a fragmentary view illustrating a braking sensor provided in a position control system according to a fourth embodiment of the invention.

FIG. 8 shows a fourth embodiment of the invention, according to which the braking sensor is formed by the front brake system of a motorcycle. A front master cylinder 8", which is operatively connected to a front wheel brake lever 56', is connected to the rear damper 11 through an oil pipe 14', and also to a front caliper 6' for imparting a frictional braking force to a front brake disk 5' rotatable in unison with the front wheel 107. At braking, the front master cylinder 8" supplies pressurized oil to the rear damper 11 as well as to the front caliper 6'. Thus, the component elements of the front brake system have both a braking function and a braking sensing function. Except for the above arrangement, the present embodiment may have a substantially identical arrangement with the first and third embodiments.

According to the above explained third and fourth embodiments, no separate cylinder forming the braking sensing means is required as distinct from the first embodiment, thereby simplifying the construction of the present system and reducing the weight of same.

Figure 10:
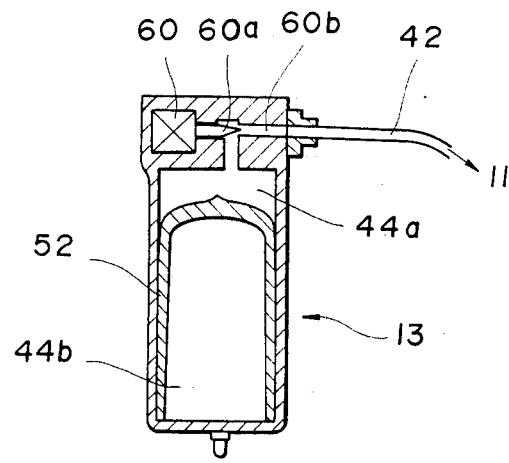
FIG. 10 is a sectional view illustrating the sub tank in FIG. 9.

Referring next to FIGS. 9 and 10, a fifth embodiment of the invention is illustrated. This fifth embodiment is distinguished from the first embodiment in that the braking sensor is formed by a pressure sensor. The pressure sensor 57 formed of an electrical means is secured on the rear fork 2' and has a pressure sensing end 57a disposed in contact with the caliper bracket 7. At braking, the pressure sensing end 57a is urgedly displaced by the pivoting caliper bracket 7 to supply an electrical signal indicative of the urging force of the bracket 7, i.e. the braking force to an electronic control unit 58. Electromagnetic valves 59 and 60 are arranged, respectively, on the rear damper 11 and the sub tank 13. The control unit 58, which is supplied with electric power from a power source 61, is arranged to operate in response to the above electrical signal from the pressure sensor 57 to control the electromagnetic valves 59, 60 to control the damping force of the rear damper 11 and the damping force adjusting action of the sub tank 13, respectively.

More specifically, as shown in detail in FIG. 10, the electromagnetic valve 60 is formed of a stepping motor, and is disposed to have its valve body 60a displaced in response to control pulses supplied from the control unit 58 to vary the effective cross-sectional area of an oil passage 60b connected to an oil pipe 42 leading to the rear damper 11, thereby varying the flow resistance which the oil flowing in the oil passage 60b undergoes. Thus, the damping force adjustment of the sub tank 13 is controlled. The other electromagnetic valve 59 may have a similar construction to that of the valve 60, and is arranged to urgingly displace the rod 36 of the rear damper 11 (FIG. 3) toward the piston 25 (FIG. 3) at braking so as to increase the damping force of the rear damper 11 on the expansion stroke.

Figure 11:
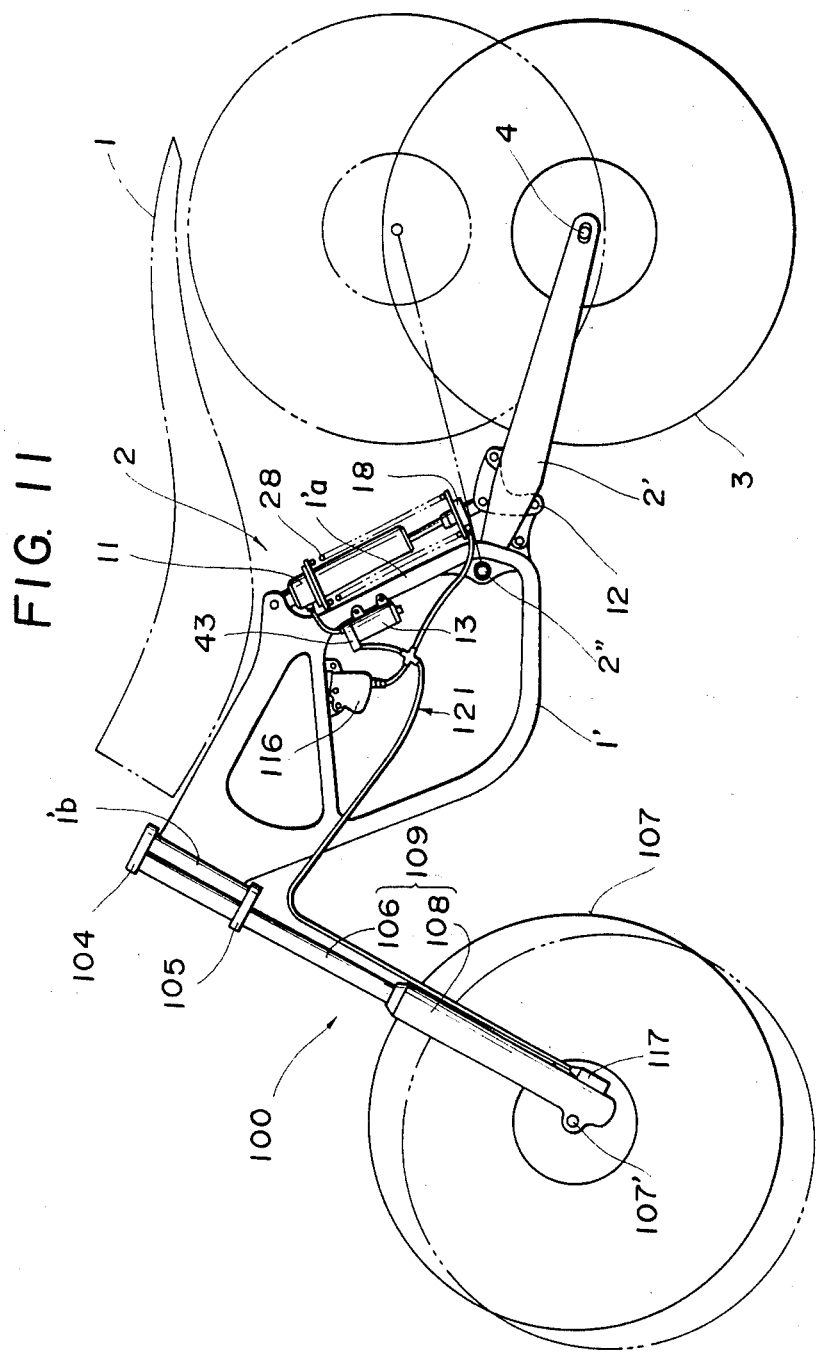
FIG. 11 is a schematic side view of a motorcycle equipped with a position control system according to a sixth embodiment of the invention.
Figure 12:
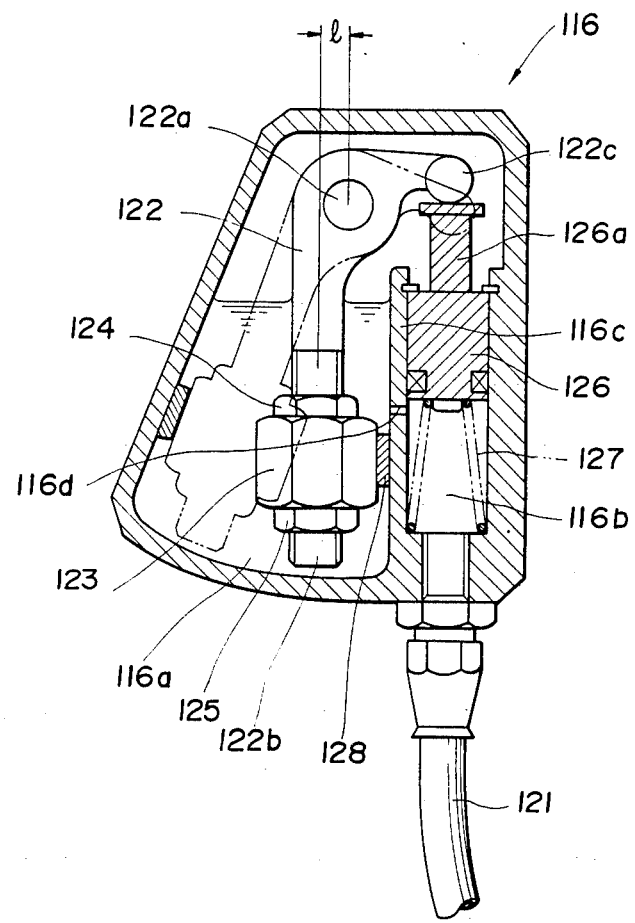
FIG. 12 is a sectional view illustrating a speed change sensor provided in the position control system in FIG. 11.
Figure 13:
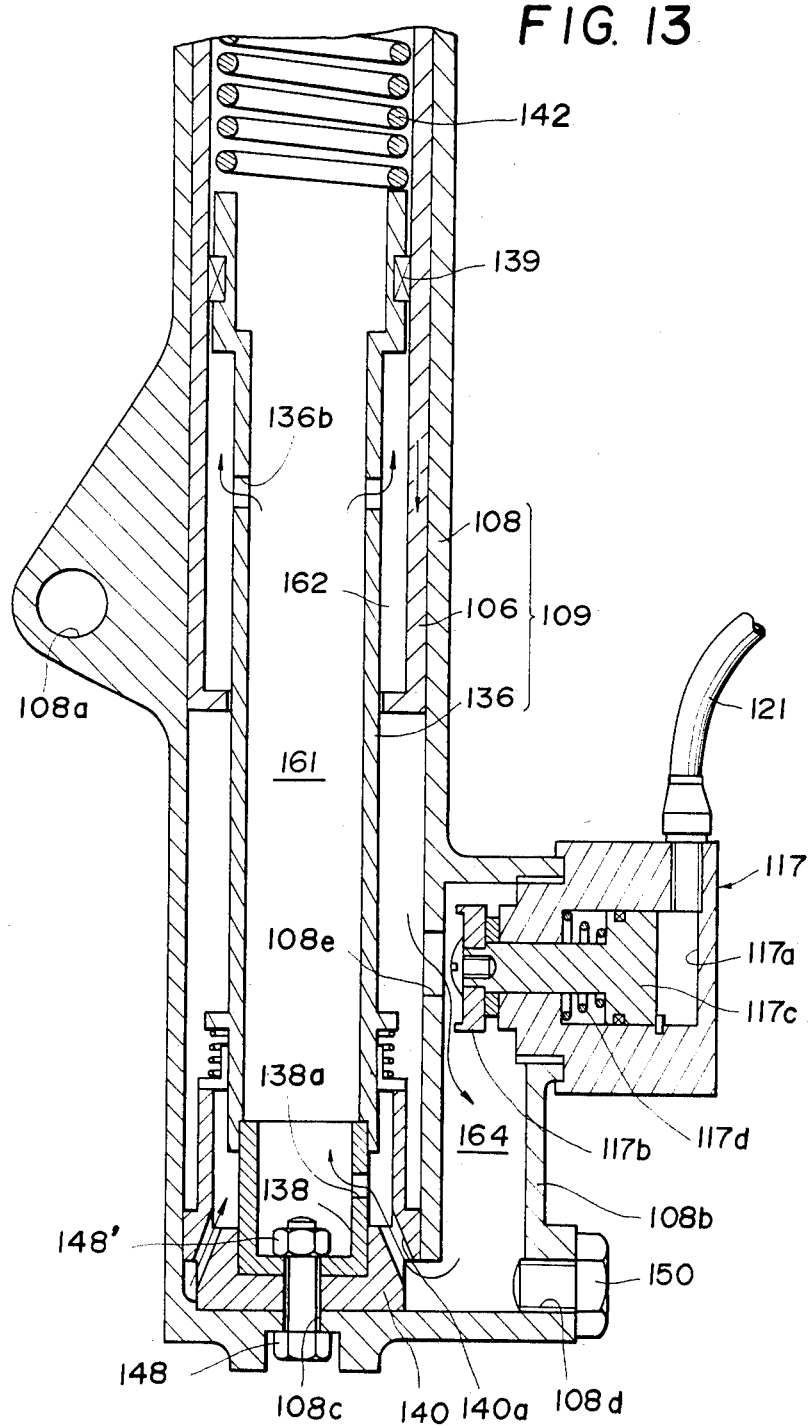
FIG. 13 is a fragmentary sectional view illustrating the front wheel suspension in FIG. 11.

FIGS. 11 through 13 show a sixth embodiment of the invention. This embodiment is adapted to detect both accelerating conditions and decelerating conditions of a vehicle including a braking condition of same. Further, this embodiment is adapted to control the damping force of the front wheel suspension besides that of the rear wheel suspension, in response to the detected conditions of the vehicle.

Referring first to FIG. 11, a motorcycle to which is applied the present embodiment has a front wheel suspension 100 and a rear wheel suspension 2 arranged, respectively, on front and rear portions of the frame body 1'. While the rear wheel suspension 2 has a similar construction to that in the first embodiment, the front wheel suspension 100 has a front fork 109 rotatably supported on the frame body 1' by means of a top bridge 104 and a bottom bridge 105 rotatably fitted on a head pipe 1'the frame body 1'. The front fork 109 is formed of a pair of left and right fork pipes 106 secured to the bridges 104, 105, and a pair of left and right fork bottom cases 108 fitted on lower portions of the fork pipes 106 for axial movement relative thereto and supporting a front wheel 107 at their lower ends, accommodating cushion springs, not shown, and filled with operating oil (hereinafter called "oil"). A sensor 116 for sensing a change in the motorcycle speed is mounted on the frame body 1', and is connected by oil pipes 121 to damping force adjusters 117, 27 and 43 arranged, respectively, on the front fork 109, the rear damper 11, and the sub tank 13 connected to the rear damper 11.

As shown in FIG. 12, the speed change sensor 116 comprises a pendulum chamber 116a, and a cylinder chamber 116b. A pendulum 122 having an inverted L-shaped configuration is pivotally supported on a stationary fulcrum shaft 122a, and has a longer arm 122b with a weight 123 threadedly fitted thereon in a manner adjustable in axial position thereon by adjusting nuts 124 and 125 fitted on the arm 122b. On the other hand, the pendulum 122 has a shorter arm 122c with its tip disposed in urging contact with an end face of a piston rod 126a integral with a piston 126 slidably received within the cylinder chamber 116b in a liquidtight manner. A return spring 127 is mounted within the cylinder chamber 116 and urging the piston 126 against the shorter arm 122c of the pendulum 122. The axis of the longer arm 122b of the pendulum 122 is out of alignment with the axis of the fulcrum shaft 122a with an offset l so that the pendulum 122 is normally biased by a moment in the counterclockwise direction as viewed in FIG. 12, with its weight 123 in urging contact with a stopper 128 arranged on a partition wall 116c separating the two chambers 116a, 116b from each other. The two chambers 116a, 116b communicate with each other through a through hole 116d formed through the partition wall 116d so that no increase occurs in the oil pressure within the chamber 116b even when the oil within the oil pipe 121 and the cylinder chamber 116b increases in volume with an increase in its temperature. The pendulum 123 is immersed in the oil within the pendulum chamber 116a.

If the speed change sensor 116 is mounted on a vehicle with its weight 123 located forwardly of the cylinder chamber 116b in the running direction of the vehicle, at deceleration of the vehicle, the pendulum 122 is rotated about the fulcrum fhaft 122a in the clockwise direction as viewed in FIG. 12 into a position indicated by the chain lines, to cause the piston 126 to be downwardly displaced. When the piston 126 is thus moved downward over the through hole 116d to close same, there occurs an increase in the oil pressure within the cylinder chamber 116b. In this way, the speed change sensor 116 functions as a sensor for sensing deceleration of the vehicle. On the contrary, if the speed change sensor 116 is mounted on the vehicle with its cylinder chamber 116b located forwardly of the weight 123 in the running direction of the vehicle, at acceleration of the vehicle the pendulum 122 is rotated about the fulcrum shaft 122a in the counterclockwise direction as viewed in FIG. 12 so that there occurs an increase in the oil pressure within the cylinder chamber 116b in the same manner as above. In this way, the speed change sensor 116 then functions as a sensor for sensing acceleration of the vehicle.

The front fork 109 is constructed as shown in FIG. 13. At one lateral side of the motorcycle, the front fork 109 mainly comprises a fork bottom case 108, a fork pipe 106, and a cylinder 136 which are arranged concentrically with each other, the fork pipe 106 being slidably fitted in the fork bottom case 108. The front bottom case 108 is formed with a wheel supporting hole 108a through which a front wheel axle 107' in FIG. 11 is to supportedly extend, a mounting portion 108b on which the damping force adjuster 117 is mounted and defining therein communication passages, hereinafter referred to, a through hole 108c, and a drain hole 108d. The damping force adjuster 117 mounted on the mounting portion 108b comprises a cylinder chamber 117a, a piston 117c slidably received within the cylinder chamber 117a and having a valve body 117b at its tip outside the cylinder chamber 117a, and a return spring 117d mounted within the cylinder chamber 117a and urging the piston 117c in a direction away from the fork bottom case 108. The cylinder chamber 117a communicates with the cylinder chamber 116b of the speed change sensor 116 by way of the oil pipe 121.

The fork pipe 106 has its lower end portion adapted to act as a piston as the front fork 109 is contracted or expanded.

The cylinder 136 is disposed in contact with the inner peripheral wall of the fork pipe 106 with an oil seal 139 interposed therebetween, and is supported by a lower part of the fork bottom case 108 by means of a cylinder support member 138 and a cylindrical member 140. A cushion spring 142 formed by a coil spring is arranged adjacent an upper end of the cylinder 136 and permanently urges the cylinder 136 against the cylinder support member 138.

The cylinder support member 138 and the cylindrical member 140 are secured to the fork bottom case 108 by means of a fastening bolt 148 screwed through the through hole 108c and a nut 148'. A drain bolt 150 is removably threadedly fitted in the drain hole 108d for supply and drainage of oil therethrough when required.

First through fourth communication passages 161–164 are defined in a lower part of the front fork 109 by various members or parts such as the cylinder 136. A valve hole 108e, and orifices 136b, 138a and 140a are formed, respectively, in the fork bottom case 108, the cyliner 136, and the cylindrical member 140 at predetermined locations in a manner allowing oil to flow between the communication passages 161, 162, 163 and 164.

The other component elements not referred to above are arranged and constructed in a manner substantially identical with corresponding ones of the first embodiment shown in FIGS. 1 through 3. For instance, the rear damper 11 and the sub tank 13 appearing in FIG. 11 are identical in construction with those appearing in FIG. 3.

With the above arrangement of the sixth embodiment, during running of the motorcycle, vibrations or shocks being transmitted to the motorcycle body are attenuated by the elasticity of the cushion spring 142 of the front wheel suspension 100 as well as by the action of the rear wheel suspension 2, and at the same time elastic vibrations of the cushion springs are damped by the actions of the front fork 10 and the rear damper 13. On this occasion, the speed change sensor 116 is not actuated since the piston 126 of the speed change sensor 116 is held stationary by the return spring 127, and the weight 123 is not easily movable due to its immersion in the oil so that the pendulum 122 will not be rotated unless a change occurs in the vehicle speed which exceeds a certain value.

The damping action of the front fork 109 is as follows: When the spring 142 is contracted and the fork pipe 106 is downwardly moved within the fork bottom case 108 in FIG. 13, by a shock applied to the front wheel 107, the oil within the third communication passage 163 is pressurized by the piston-like action of the downwardly moving fork pipe 106 so that part of the same oil flows into the fourth communication passage 164 through the valve hole 108e, and further flows into the first and second communication passages 161, 162 through the orifices 140a, 138a, and 136b. When the spring 142 is expanded due to its own restitution coefficient immediately after it has been contracted as above, the oil flows back in the way reverse to that stated above. On this way, the oil undergoes flow resistance to produce a damping force for damping the vibrations of the spring 142. The damping action of the rear damper 11 is identical with that described previously with reference to the first embodiment.

When during deceleration of the motorcycle a change occurs in the rate of deceleration, which exceeds a predetermined value, or when the motorcycle is braked, the pendulum 122 with the weight 123 in FIG. 12 is rotated about the fulcrum shaft 122a due to its own inertia force in the clockwise direction as viewed in the same figure. This rotation of the pendulum 122 causes downward movement of the piston 126 against the force of the return spring 127 to increase the oil pressure within the cylinder chamber 116b. Due to immersion of the weight 123 in the oil, sudden rotation of the pendulum 122 is restrained to thereby prevent a sudden increase in the oil pressure within the cylinder chamber 116b and corresponding sudden increasing adjustment of the damping force, hereinafter referred to.

When the oil pressure increases within the cylinder chamber 116b, the resulting pressurized oil in the chamber 116b is discharged through the oil pipe 121 into the cylinder chamber 117a of the damping force adjuster 117 of the front fork 109 to act upon the piston 117c. As a result, the piston 117c is displaced in the leftward direction as viewed in FIG. 13 to move its valve body 117b in the direction of reducing the effective opening area of the valve bore 108e. Thus, the oil undergoes increased flow resistance in passing the valve bore 108e, thereby increasing the damping force of the front fork 109.

At the same time, the pressurized oil in the cylinder chamber 116b is also supplied to the cylinder chamber 37a in the damping force adjuster or piston rod end member 27 of the rear damper 11. Therefore, as previously stated, when the motorcycle is in a decelerating condition, the expanding action of the rear damper 11 is retarded at a larger rate than when the motorcycle is not being decelerated.

Further, since the cylinder chamber 116b of the speed change sensor 116 and the oil chamber 43b of the damping force adjuster 43 of the sub tank 13 communicate with each other by the oil pipe 121, the rear damper 11 has a reduced damping force during contraction stroke thereof at deceleration of the motorcycle in the same manner as previously described with respect to the first embodiment.

By virtue of the actions of the three damping force adjusters 117, 27 and 43, the front fork 109 is not easily contracted while the rear damper 11 is not easily expanded even when the center of gravity of the motorcycle is shifted in the forward direction at deceleration, thereby preventing forward leaning of the vehicle. In addition, since the damping force of the rear damper 11 during contraction stroke of the damper is reduced at deceleration of the motorcycle, shocks from the road surface can be absorbed by the rear cushion spring at a sufficient rate. Incidentally, if the speed change sensor has a construction as employed by the embodiment of FIG. 12, the pendulum 122 will rotate not only when the vehicle is decelerated but also when the vehicle is running down a descending slope, thereby also preventing forward leaning of the vehicle in the same manner as stated above even on such an occasion.

Although the embodiment of FIGS. 11 through 13 is arranged to adjust the damping forces of both the dampers for the front wheel and the rear wheel upon occurrence of a significant change in the speed of the vehicle, the invention is not limited to such arrangement, but only either the damper for the front wheel or one for the rear wheel may be adjusted on such an occasion, if desired.

Figure 14:
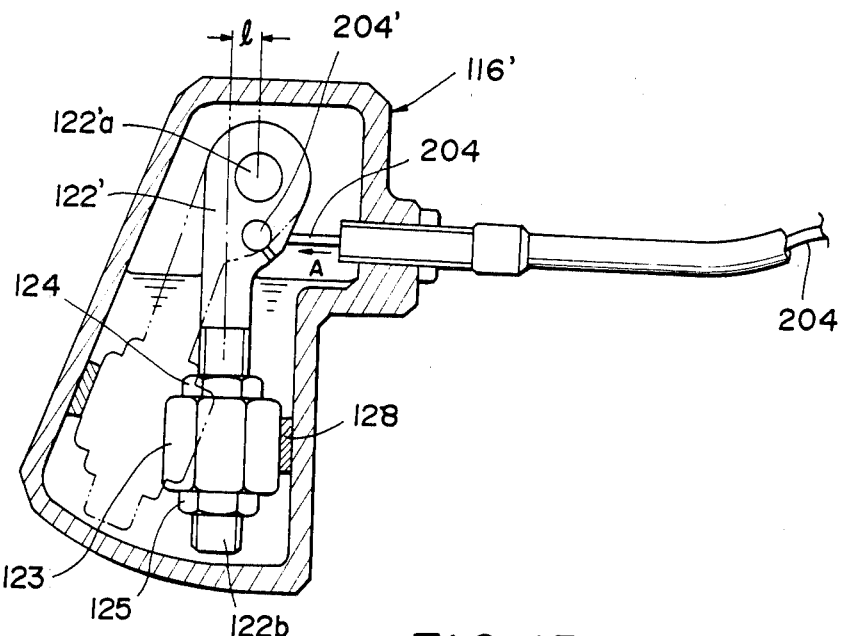
FIG. 14 is a sectional view illustrating a speed change sensor provided in a position control system according to a seventh embodiment of the invention.
Figure 15:
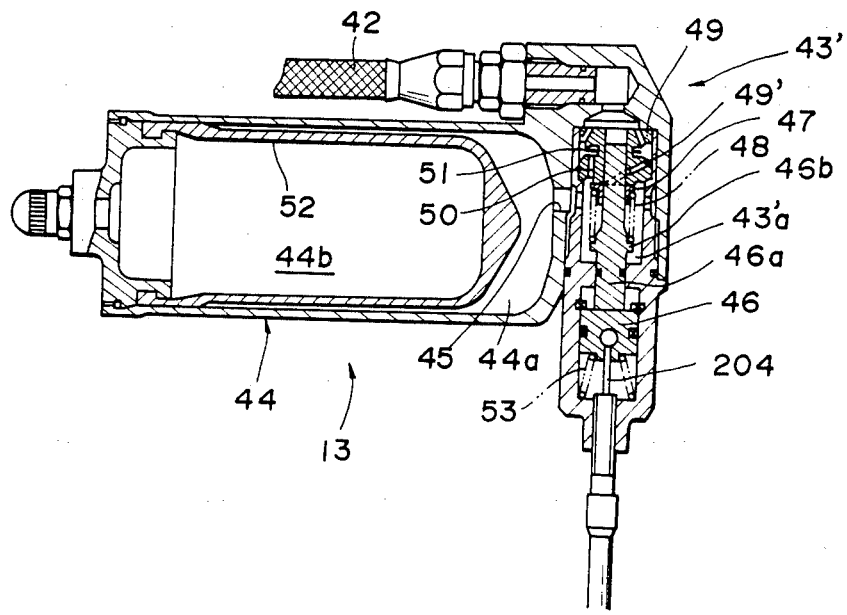
FIG. 15 is a sectional view of a sub tank provided in the position control system according to the seventh embodiment of the invention.

FIGS. 14 and 15 show a seventh embodiment of the invention, which has a substantially identical arrangement with the sixth embodiment just described above, except for the speed change sensor and a damping force adjuster. According to this seventh embodiment, the speed change sensor 116' is adapted to detect a change in the vehicle speed by means of the inertia force of the pendulum 122' provided with the weight 123 as in the FIG. 12 embodiment, but it is adapted to transmit a signal indicative of the detected speed change to a damping force adjuster, e.g. a damping force adjuster 43' for the sub tank 13 by mechanical means of a wire cable 204 connected to the pendulum 122', in lieu of the oil pressure as distinct from the FIG. 12 embodiment. The pendulum 122' of the speed change sensor 116' has another fulcrum shaft 204' rotatably fitted therethrough at a level just below the fulcrum shaft 122a and extending parallel therewith. The wire cable 204 is connected at one end to the fulcrum shaft 204' by means of an annular coupling member, not shown, fitted on the fulcrum shaft 204', and at the other end to the piston 46 of the damping force adjuster 43', respectively. When the vehicle is decelerated so that the pendulum 122' is rotated about the frulcrum shaft 122a in the clockwise direction as viewed in FIG. 14, the wire cable 204 is pulled by the pendulum in the direction of the arrow A in FIG. 14. As a consequence, the piston 46 of the damping force adjuster 43' is moved in the downward direction as viewed in FIG. 15 to cause a reduction in the setting load of the spring 48 of the slide valve 47, thereby reducing the damping force of the rear damper 11 during contraction, in the same manner as previously stated.

If the speed change sensor shown in FIG. 12 or in FIG. 14 is used as an acceleration rate sensor, the damping force adjuster 43' may be arranged so that the damping force of the rear damper 11 during contraction stroke of the damper increases when the vehicle is accelerated, thereby preventing rearward leaning of the vehicle.

Figure 16:
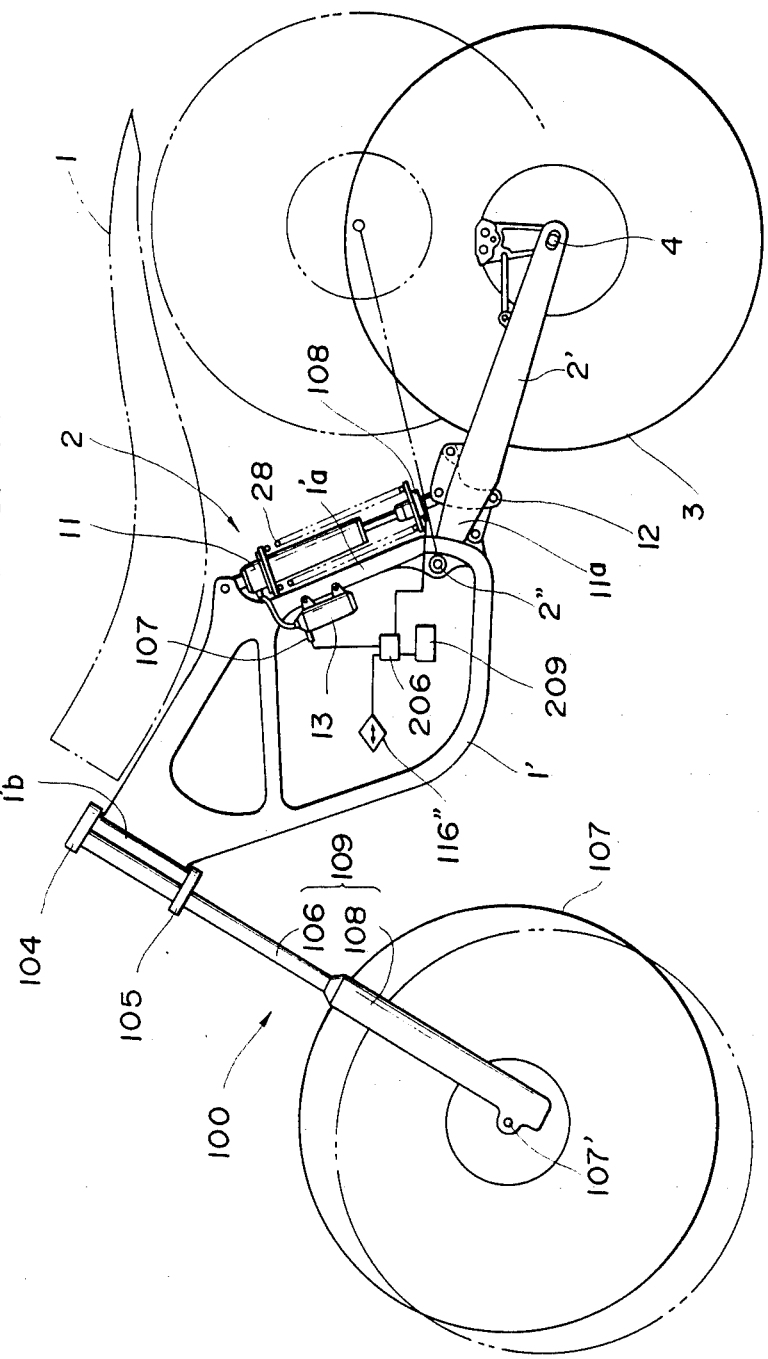
FIG. 16 is a schematic side view of a motorcycle equipped with a position control system according to an eighth embodiment of the invention.

Referring next to FIG. 16, there is illustrated an eighth embodiment of the invention. This embodiment is distinguished from the sixth embodiment in that the speed change sensor and its peripheral parts are formed by electrical means. An acceleration/deceleration sensor 116" forming the speed change sensor, which may be formed by a G-meter for instance, is adapted to generate an electrical signal indicative of an accelerating condition or a decelerating condition of the vehicle when the vehicle is in such a condition. An electronic control unit 206, which is fed by a power source 209, is operable in response to the above electrical signal from the sensor 116" to control the supply of driving signals to electromagnetic valves 207 and 208 forming damping force adjusters for the sub tank 13" and the rear damper 11, respectively. The electromagnetic valves 207, 208 may have constructions similar to that of the electromagnetic valve 60 in FIG. 10.

Figure 19:
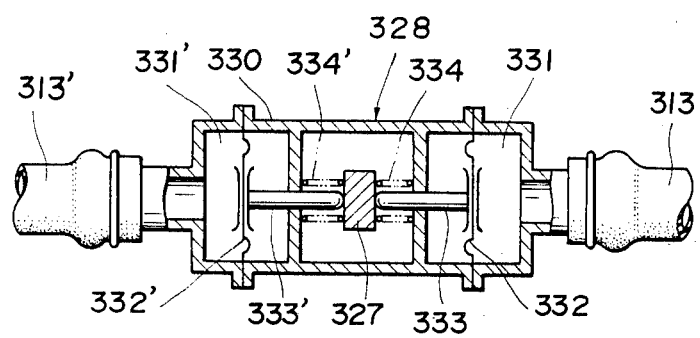
FIG. 19 is a sectional view taken along line XIX—XIX in FIG. 18.
Figure 17:
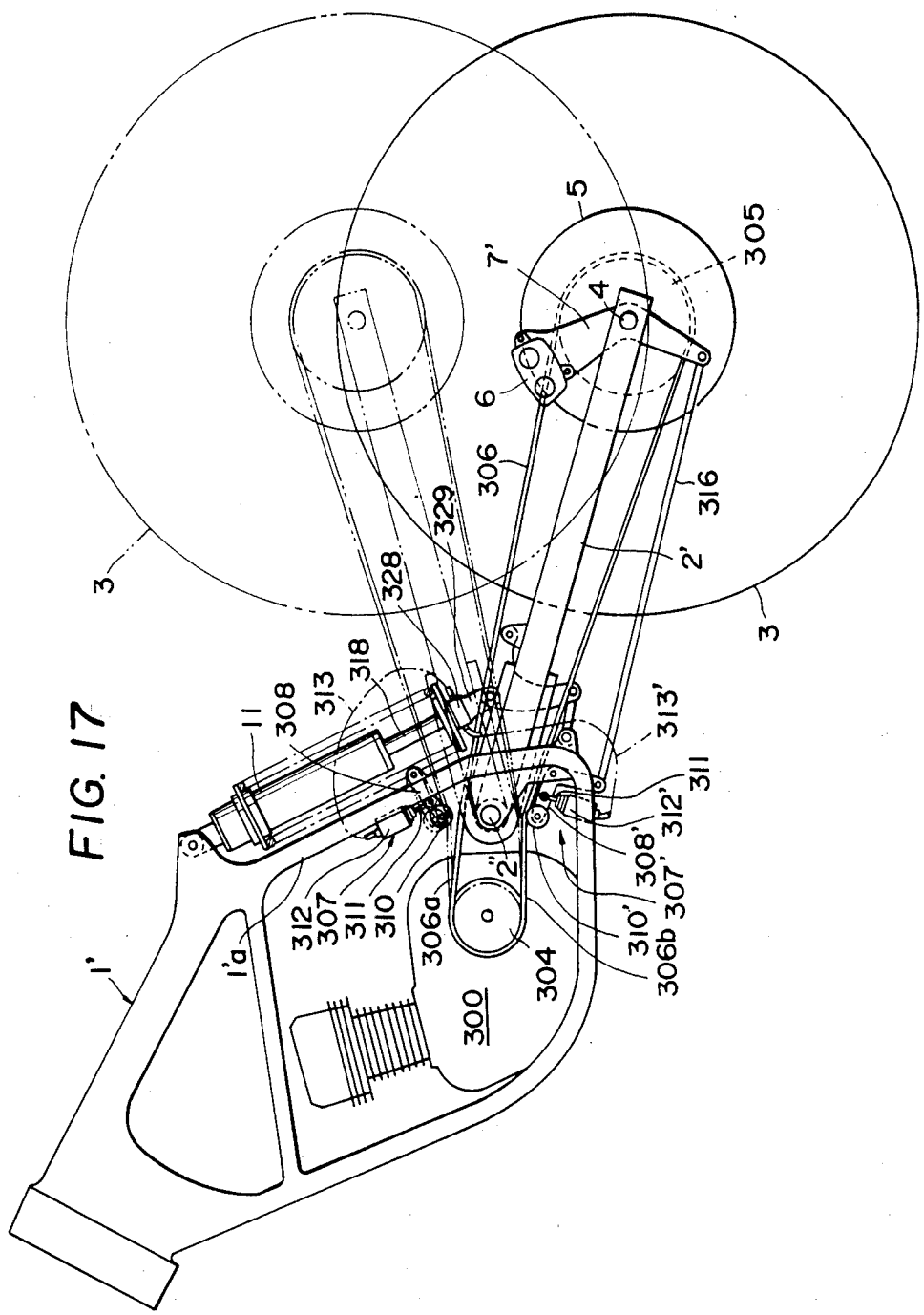
FIG. 17 is a side view illustrating means for sensing accelerating conditions and decelerating conditions of a vehicle, including braking conditions thereof, provided in a position control system according to a ninth embodiment of the invention.

FIGS. 17 through 19 show a ninth embodiment of the invention, which is characterized in that accelerating conditions and decelerating conditions of the vehicle are detected from the tension of a gearing chain, and also characterized by the construction of a damping force adjuster. In FIG. 17, a driving sprocket 304 of an engine 300 which is supported by the frame body 1' is located forwardly of the fulcrum shaft 2". A gearing chain 306 is wound around the driving sprocket 304 and a driven sprocket 305 of the rear wheel 3, with the fulcrum shaft 2" interposed between upper and lower side portions 306a and 306b of the chain 306. A first sensor 307 is arranged in facing relation to the upper surface of the upper side portion 306a of the gearing chain 306, and a second sensor 307' to the lower surface of the lower side portion 306b of the chain 306, respectively. The first and second sensors 307, 307' each comprise a sensing arm 308, 308' vertically pivotably coupled to the center pillar 1'a, a pressure-receiving roller 310, 310' mounted on a free end of the corresponding sensing arm 308, 308', a hydraulic pressure-generating cylinder 312, 312' coupled to an intermediate portion of the corresponding sensing arm 308, 308' via a rod 311, 311', and an output hydraulic pressure conduit 313, 313' extending from the corresponding cylinder 312, 312'. The cylinder body of the hydraulic pressure-generating cylinder 312, 312' is fixed to the frame body 1' at a suitable location. The pressure-receiving roller 310 on the upper side is disposed close to the upper surface of the upper side portion 306a of the gearing chain 306, and the pressure-receiving roller 310' to the lower surface of the lower side portion 306b of the chain 306, respectively, both of the rollers being located on a vertical line extending through the center of the fulcrum shaft 2" for the rear fork 2'. The caliper bracket 7' is coupled through a torque rod 316 to the rear end of the sensing arm 308' of the second sensor 307', which is in the form of a bell crank.

With the above arrangement of the ninth embodiment, when no large tractive force or tensile force is produced in the gearing chain 306 while the vehicle is cruising or in a like operating condition, the gearing chain 306 will not apply any large urging force to the pressure-receiving roller 310 or 310' but will merely be bent by the rear fork 2' even if the chain 306 comes into urging contact with the roller 310 or 310' in unison with vertical swinging of the rear fork 2', whereby no positive hydraulic pressure is generated by either of the hydraulic pressure-generating cylinders 312, 312'.

On the other hand, when the vehicle is accelerated, a large tractive force is produced in the upper side portion 306a of the gearing chain 306, which corresponds in magnitude to the degree of acceleration. Therefore, if on this occasion the rear fork 2' is upwardly swung to bring the upper side portion 306a of the gearing chain 306 into urging contact with the pressure-receiving roller 310 of the first sensor 307, the chain 306 will apply an urging force to the same roller 310 so that the sensing arm 308 is upwardly swung to thereby cause the hydraulic pressure-generating cylinder 312 to generate a positive hydraulic or oil pressure which is supplied through the output hydraulic pressure conduit 313 as an acceleration-indicative signal.

When the vehicle is decelerated, a tractive force is produced in the lower side portion 306b of the gearing chain 306, which corresponds in magnitude to the degree of deceleration. Therefore, if on this occasion the rear fork 2' is downwardly swung to bring the lower side portion 306b of the gearing chain 306 into urging contact with the pressure-receiving roller 310' of the second sensor 307', the chain 306 will apply an urging force to the same roller 310' so that the sensing arm 308' is downwardly swung to thereby cause the hydraulic pressure-generating cylinder 312' to generate a positive hydraulic or oil pressure which is supplied through the output hydraulic pressure conduit 313' as a deceleration-indicative signal.

When the brake system of the motorcycle is actuated, braking torque applied to the brake disk 5 by the brake caliper 6 is transmitted through the torque rod 316 to the sensing arm 308' of the second sensor 307' to cause the latter to be downwardly swung so that a positive hydraulic hydraulic pressure is generated by the hydraulic pressure-generating cylinder 312' in the same manner as at deceleration of the vehicle, and is supplied through the output hydraulic pressure conduit 313' as a braking-indicative signal.

Details of the rear damper 11' are shown in FIG. 18 wherein component elements corresponding to those of the rear damper 11 in FIG. 3 are designated by identical reference numerals. The piston 25 is formed therein with a communication passage 321 communicating the first and second cylinder chambers 24a, 24b defined within the cylinder with each other. The communication passage 321 is provided with a check valve 322 disposed to allow oil to flow only from the second cylinder chamber 24b to the first cylinder chamber 24a. Arranged opposite an open end a of the communication passage 321 opening in the second cylinder chamber 24b is a tapered valve portion 323a of a rod-like adjuster valve 323 slidably fitted within the piston rod 26 and disposed to have its tapered valve portion 323a gradually reduce the effective cross-sectional area of the open end a of the communication passage 321 as it lifts.

The piston 25 and the adjuster valve 323 are formed therein with a continuous communication passage 321' communicating the first and second cylinder chambers 24a, 24b with each other and provided with a check valve 324 disposed to allow oil to flow only from the first cylinder chamber 24a to the second cylinder chamber 24b. The communication passage 321' is divided into two parts at the boundary between the piston 25 and the adjuster valve 323. The two parts of the communication passage 321' have respective open ends b and c normally aligned with each other but gradually brought out of alignment with each other as the adjuster valve 323 downwardly retreats, to thereby throttle the passage 321'.

The adjuster valve 323 has its lower end formed with a rotating helical cam 325, whereas a stationary helical cam 326 is secured on the piston rod 26 and disposed in engagement with the rotating helical cam 325. The rotating helical cam 325 has an operating arm 327 laterally projected therefrom and drivenly engaging with a hydraulically actuated cylinder 328 mounted on a mounting member 329 supporting the piston rod 26.

As shown in FIG. 19, the hydraulically actuated cylinder 328 comprises a cylinder body 330 fixed to the mounting member 329, a pair of diaphragms 332 and 332' separating the interior of the cylinder body 330 into first and second oil chambers 331, 331' at opposite end portions of the cylinder body 330, a pair of operating rods 333 and 333' secured to the centers of the corresponding diaphragms 332, 332' and holding tip of the operating arm 327 therebetween, and a pair of return springs 334 and 334' accommodated within the cylinder body 330 and urgingly maintaining the operating arm 327 in its neutral position. The first oil chamber 331 is connected to the output hydraulic pressure conduit 313 extending from the first sensor 307, while the second oil chamber 331' is connected to the output hydraulic pressure conduit 313' extending from the second sensor 307'.

A first buffer valve 335 is arranged at a lower open end of the through hole 30 formed through the piston 25, which is adapted to be opened only when the oil pressure within the second cylinder chamber 24b increases above the oil pressure within the first cylinder chamber 24a by a predetermined amount or more, while a second buffer valve 335' is arranged at an upper open end of the through hole 31 formed through the piston 25, which is adapted to be opened only when the oil pressure within the first cylinder chamber 24a increases above the oil pressure within the second cylinder chamber 24b by a predetermined amount or more.

With the above arrangement of FIGS. 18 and 19, when the piston 25 is lifted or upwardly moved relative to the cylinder 24 due to upward swinging of the rear fork 2', first the oil within the second cylinder chamber 24b is forced to move through the communication passage 321 into the first cylinder chamber 24a. On this occasion, the flow resistance that the oil undergoes in passing the communication passage 321 causes a damping force counteracting the upward movement of the piston 25. If at this time a positive oil pressure is generated from the first sensor 307 as an acceleration-indicative signal and supplied through the output hydraulic pressure conduit 313, the same oil pressure is introduced into the first oil chamber 331 where it deforms the diaphragm 332 to displace the operating rod 333 in the leftward direction as viewed in FIG. 19, which in turn causes rotation of the operating arm 327 to rotate the rotating helical cam 325 in the R direction in FIG. 18 relative to the stationary helical cam 326 so that there occurs a change in the position of the former cam 325 relative to the latter cam 326 to thereby lift or upwardly move the adjuster valve 323. Thus, the open end a of the communication passage 321 is restricted by the tapered valve portions 323a of the adjuster valve 323, thereby increasing the flow resistance acting upon the oil flowing through the passage 321 and accordingly increasing the damping force counteracting the lifting of the piston 25.

Then, when the lifting speed of the piston 25 increases so that the oil pressure within the second cylinder chamber 24b exceeds the oil pressure within the first cylinder chamber 24a by the predetermined amount or more, the first buffer valve 335 is opened so that part of the oil within the second cylinder chamber 24b moves to the first cylinder chamber 24a mainly through the through hole 30, whereby the flow resistance that the oil undergoes in passing the through hole 30 and that is determined by the degree of opening of the first buffer valve 335 causes a damping force counteracting the lifting motion of the piston 25.

On the other hand, when the piston 25 is downwardly moved relative to the cylinder 24 due to downward swinging of the rear fork 2', first the oil within the first cylinder chamber 24a is forced to move through the communication passage 321' into the second cylinder chamber 24b, whereby the flow resistance that the oil undergoes in passing the communication passage 321' causes a damping force counteracting the downward movement of the piston 25. If at this time a positive oil pressure is generated from the second sensor 307' as a deceleration-indicative signal or a braking-indicative signal and supplied through the output hydraulic pressure conduit 313', the same oil pressure is introduced into the second oil chamber 331' where it deforms the diaphragm 332' to displace the operating rod 333' in the rightward direction as viewed in FIG. 19, which in turn causes rotation of the operating arm 327 to rotate the rotating helical cam 325 in a direction reverse to the R direction in FIG. 18 relative to the stationary helical cam 326 to thereby downwardly move the adjuster valve 323. Thus, the opposite open ends b, c of the oil passage 321' become out of alignment, thereby increasing the flow resistance acting upon the oil flowing through the passage 321' and accordingly increasing the damping force counteracting the downward movement of the piston 25.

What is claimed is:

1. A vehicle body position control system for use in a vehicle including a body and at least one rear wheel, said position control system comprising:
   a buffer having (i) an elastic support elastically supporting said rear wheel on said vehicle body and (ii) a damper for generating a damping force for damping elastic vibrations of said elastic support, said elastic support comprising a spring elastically contractible and expansible in response to vibrations transmitted from said rear wheel,
   said damper comprising:
      a cylinder engaging one end of said spring and defining therein a cylinder chamber filled with operating fluid,
      a piston slidably received within said cylinder chamber and separating said cylinder chamber into first and second cylinder chambers,
      communication passage means formed in said piston and communicating said first and second cylinder chambers with each other, and
      means responsive to elastic contraction and expansion of said spring for imparting flow resistance to said operating fluid flowing in said communication passage means to thereby generate said damping force;
   a deceleration sensor for sensing decelerating conditions of said vehicle and generating an output signal indicative of a sensed decelerating condition of said vehicle;
   a damping force adjuster responsive to said output signal for adjusting said damping force of said damper of said buffer, said damping force adjuster being adapted to adjust said damping force so as to retard a motion of said rear wheel in a direction away from said vehicle body at a larger rate when said output signal is generated than when said output signal is not generated;
   a tank having an interior filled with operating fluid; a second damping force adjuster having second communication passage means communicating the interior of said tank with one of said first and second cylinder chambers which has operating fluid pressure therein increased when said spring is contracted;
   valve means for closing and opening said second communication passage means; and
   means responsive to said output signal from said deceleration sensor for actuating said valve means to open said second communication passage means at a value of operating fluid pressure within said one of said first and second cylinder chambers lower than a value of said operating fluid pressure at which said valve means is opened when said output signal from said deceleration sensor is not generated, thereby reducing the damping force of said damper of said buffer during contraction of said spring at deceleration of said vehicle.

2. A vehicle body position control system as claimed in claim 1, wherein said vehicle includes braking means, said deceleration sensor being adapted to sense braking conditions of said vehicle caused by the braking action of said braking means and generate said output signal in response to a sensed braking condition of said vehicle.

3. A vehicle body position control system as claimed in claim 2, wherein said vehicle includes a rear axle supporting said rear wheel thereon, said braking means including a brake disk rotatable in unison with said rear wheel, and a caliper disposed for causing said brake disk to apply a frictional braking force to said brake disk, said deceleration sensor including a caliper bracket mounted on said rear axle for pivoting thereabout in response to said application of said frictional braking force to said brake disk, a cylinder chamber filled with operating fluid, and a piston slidably received within said cylinder chamber and connected to said caliper bracket, whereby upon frictional braking of said brake disk, said piston is moved within said cylinder chamber by said caliper bracket in a direction generating said hydraulic pressure in said cylinder chamber as said output signal indicative of a sensed braking condition of said vehicle.

4. A vehicle body position control system as claimed in claim 1, wherein said communication passage means of said buffer includes a communication passage communicating said first and second cylinder chambers with each other and having an effective cross-sectional area, said damping force adjuster including means responsive to said output signal from said deceleration sensor for reducing the effective cross-sectional area of said communication passage.

5. A vehicle body position control system as claimed in claim 4, wherein said buffer includes a hollow piston rod combined with said piston, said effective cross-sectional area-reducing means of said damping force adjuster including a rod extending through said piston rod and having one end disposed in said communication passage, and actuator means responsive to said output signal for causing said one end of said rod to advance into said communication passage.

6. A vehicle body position control system as claimed in claim 5, wherein said deceleration sensor is adapted to generate a hydraulic pressure as said output signal indicative of a sensed decelerating condition of said vehicle, said actuator means of said damping force adjuster comprising a second cylinder disposed at another end of said rod to be supplied with said hydraulic pressure, and a second piston slidably received within said second cylinder and movable therein in unison with said rod, whereby said second piston is urgedly biased by said hydraulic pressure in a direction in which said rod advances into said communication passage.

7. A vehicle body position control system as claimed in claim 1, including a check valve arranged at said communication passage, said check valve being responsive to a difference in operating fluid pressure between said first and second cylinder chambers caused by expansion of said spring, for opening said communication passage.

8. A vehicle body position control system as claimed in claim 1, wherein said deceleration sensor is adapted to generate a hydraulic pressure as said output signal indicative of a sensed decelerating condition of said vehicle, said second damping force adjuster comprising:
   first and second chambers,
   a piston member slidably received within said first chamber,
   a piston rod member disposed within said second chamber and movable in unison with said piston member,
   an annular member formed therein with part of said second communication passage means,
   said piston rod member having one end portion remote from said piston member received in said annular member,
   a slide valve slidably fitted on said piston rod for closing and opening said part of said second communication passage means,
   a second spring having one end engaging said piston rod member and another end urgingly biasing said slide valve against said annular member to keep said slide valve in a position closing said part of said second communication passage means, and
   means for causing said hydraulic pressure to act upon said piston member to thereby bias same in a direction away from said annular member whereby said second spring has a reduced force urging said slide valve.

9. A vehicle body position control system as claimed in claim 1, wherein said vehicle is a motorcycle including a rear fork having one end portion pivotally supported by said body of said vehicle and another end supporting said rear wheel, said buffer having one end supported by said body of said vehicle and another end supported by said rear fork.

* * * * *